| 
US007062003B2

(12) United States Patent
Samuel

(10) Patent No.: US 7,062,003 B2
(45) Date of Patent: Jun. 13, 2006

(54) SELF-TUNING BAUD RATE GENERATOR FOR UART APPLICATIONS

(75) Inventor: Roshan J. Samuel, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 733 days.

(21) Appl. No.: 10/259,158

(22) Filed: Sep. 27, 2002

(65) Prior Publication Data

US 2004/0062331 A1 Apr. 1, 2004

(51) Int. Cl.
*H04L 7/00* (2006.01)
(52) U.S. Cl. .............. 375/354; 375/359; 375/360
(58) Field of Classification Search ............... 375/360, 375/117, 354, 355, 359, 370; 370/503; 327/141, 327/160
See application file for complete search history.

(56) References Cited

U.S. PATENT DOCUMENTS 4,761,800 A * 8/1988 Lese et al. ............ 375/370

* cited by examiner

*Primary Examiner*—Dac Ha
*Assistant Examiner*—Jaison Joseph
(74) *Attorney, Agent, or Firm*—Robert D. Marshall, Jr.; W. James Brady; Frederick J. Telecky, Jr.

(57) ABSTRACT

The invention describes a baud rate generator for use in a sampled data system. This generator makes possible the sampling of asynchronous digital input data when its baud rate is not known, and does so without the use of phase-locked loop circuitry. The invention uses a digital counter to count the clock intervals between successive transitions in the digital input data. This process is repeated over a period of time sufficient to assure that recognizable recurring data patterns will occur in the data stream. The smallest interval recorded by the counter is captured and is directly related to the required sampling rate.

8 Claims, 1 Drawing Sheet

SELF-TUNING BAUD RATE GENERATOR FOR UART APPLICATIONS

TECHNICAL FIELD OF THE INVENTION

The technical field of this invention is serial communications systems.

BACKGROUND OF THE INVENTION

Sampled data systems are used in a wide variety of applications operating on analog input data. Such systems most often have, as their direct goal, the high performance available using digital rather than analog data processing. Sampled data systems function either on the basis of having advanced information regarding the incoming data rate or on the basis of establishing the incoming data rate by measurement or baud rate capture.

Consider asynchronous data coded by the commonly used bi-phase coding scheme. In bi-phase coding a transition is used to code each and every '1' bit transmitted. The absence of a transition signifies a '0' being transmitted. In the bi-phase coding scheme, an input of a '1' is coded as either a positive transition from 'low' to 'high' during mid-cycle or a negative transition from 'high' to 'low' during mid-cycle. An input of a '0' is coded by the absence of a transition during mid-cycle. Any transitions that do occur at the mid-point of a data interval provide useful timing information for the decoding process.

Often, however, asynchronous data may be in the form of a stream of '1's and '0's with any possible transitions occurring only at the mid-cycle of a regularly recurring data interval. With this type of data input, only repetitive measurements of the smallest occurring interval between data transitions can establish the incoming data baud rate.

Conventional Approaches to Baud Rate Capture

Most solutions to the baud rate capture task use a phase-locked loop (PLL). The PLL will synchronize itself to the incoming data, and adjust its clock frequency to match rate of the incoming data. The advantage methods employing PLL have is that the clock used to sample the incoming data can be adjusted precisely to an incoming clock of undetermined frequency.

Another solution commonly adopted when the baud rate is a multiple of sampling clock is to require the baud rate to be programmed, or hard-wired, in to the sampling mechanism. This, however, requires that the baud rate be known in advance.

Universal Asynchronous Receiver-Transmitter (UART)

The universal asynchronous receiver transmitter (UART) is a device that can receive or transmit digital data in a serial fashion, and as such it is often an important interface port in processor devices. It is called asynchronous, because only data is transmitted, using a one-line interface with one additional line for signal ground. No clock information is transmitted. The burden is on the receiving unit to extract the serial data bits, without a clock.

Since no clock is available for synchronization, the receiving device must be able to determine when to sample the input data. For example, it must determine whether the incoming data has a rate of ten bits per second or three bits per second.

FIGS. 1 and 2 illustrate two means that have been employed in prior art, to determine incoming data rate and proceed to sample at that rate.

FIG. 1 shows a device that assumes the UART function has prior information regarding the incoming data rate. This data rate is programmed in the counter/clock generator 100, which generates clock pulses at that rate. The D flip-flop 101 will then sample the input serial data 104 at the clock rate output by-the counter.

FIG. 2 shows a second approach for capturing incoming data that assumes the UART has no prior information regarding incoming data rate. This second approach uses a phase-locked loop (PLL). This PLL 200 will be fed the input data 204, which must by definition include a pre-determined pattern code. The code '010101', is a conventional example pattern. Since each transition is one clock, the PLL can lock on to this clock rate. Once locked, the data input can be disconnected from the PLL and supplied to the D flip-flop 201. The PLL will continue to provide clocks at the required rate, which the D flip-flop can sample.

Both of these methods have severe restrictions or shortcomings.

The first method of FIG. 1 requires as a restriction that the data rate of the input data stream must be known in advance. The second method of FIG. 2 requires a PLL, a device whose operation is often hindered by power supply ripple. The PLL is also costly in silicon because of the large chip area required for their implementation.

SUMMARY OF THE INVENTION

In sampled data systems where the baud rate is a multiple of the sampling clock the use of PLL functions is superfluous and indeed, unnecessary. The method for baud rate capture described here obviates the need for a PLL and uses instead a digital counter, associated rate capture logic, and register storage of the time interval data from which the baud rate is easily computed.

The advantages of the method of baud rate capture described here are: (a) it does away with the analog PLL, which uses large chip areas and is difficult to fabricate in digital integrated processes and (b) the method does not require that the designer/programmer know the rate of the incoming data in advance.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
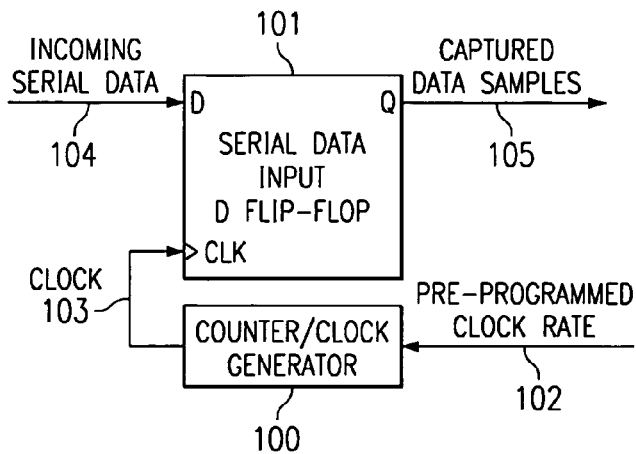
FIG. 1 illustrates a conventional UART function with associated PLL and data sampling front end (Prior Art)
Figure 2:
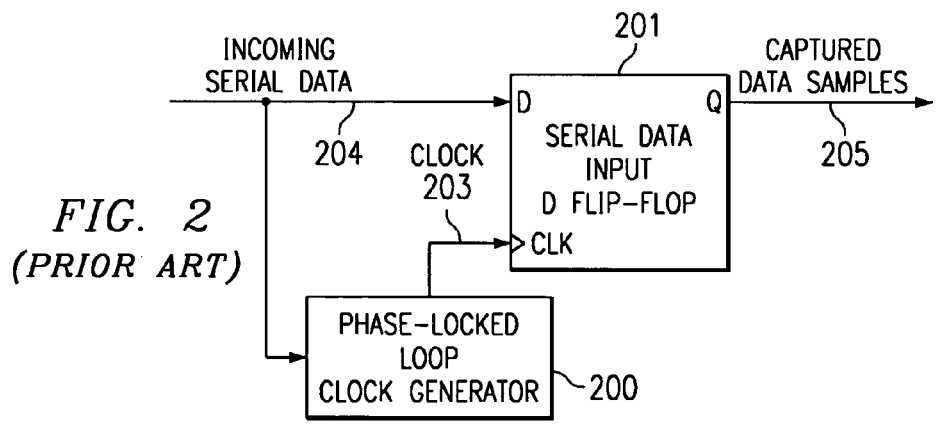
FIG. 2 illustrates the baud rate capture generator of this invention (Prior Art)
Figure 3:
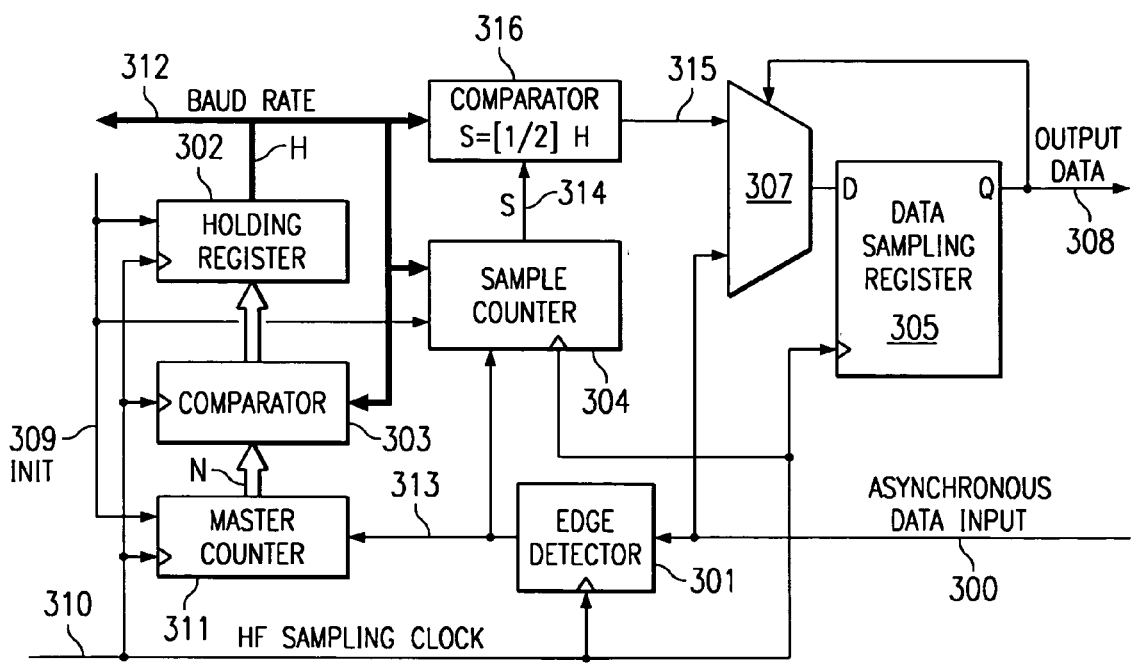
FIG. 3 illustrates a UART function employing the baud rate capture generator of this invention.

This invention allows for the sampling of asynchronous digital input data when its baud rate is not known. The asynchronous data may be bi-phase coded, in which a transmitted '1' is coded by a transition during the regularly recurring data interval, and a transmitted '0' is coded by the absence of any transition. The baud rate capture system of the present invention operates successfully also if the incoming data is simply a stream of incoming '1's and '0's. FIG. 3 illustrates the block diagram of the hardware used in the invention.

The invention employs a high frequency (HF) sampling clock 310, which has a repetition rate many times higher than the expected data rate of input data 300. The invention uses a master counter 311 to count the number of high frequency clocks occurring between successive transitions in the digital input data. This process is repeated over a period of time sufficient to assure that at least one '010' or one '101' data pattern will occur in the data stream. The smallest interval recorded by the master counter 311 is stored in a holding register as part of the baud rate-capture process. This smallest measured interval 'B' can be directly related to the baud rate of the incoming serial data. This data can then be sampled once every set number of high frequency input clocks.

Operation

A stream of asynchronous serial data input 300 having a baud rate 'B' is passed to a UART at the input of edge detector 301. Initially the holding register 302 will be reset, all bits to a '1' level with an equivalent binary value 'F'. This binary value 'F' represents a value equal to many times higher than the period corresponding to the slowest expected baud rate period 'B0' of the input data 300. The baud rate-capture process results in the holding register storing the value 'H'='B', representing the period of incoming data rate. After a sufficient number of cycles, sampling of the incoming data will be carried out repetitively at the baud rate frequency at precisely the midpoint of the time interval in which data is stable.

With multiplexer select signal 315 normally '0', sampling register 305 will re-circulate the data 308 it stores through multiplexer 307 every edge of the input HF sampling clock. Only when the comparator 316 issues a change to '1' on signal 315 does input data 300 enter the sampling register 305. This multiplexer select 315 signal change occurs only when the sample counter has counted up to the value S=½H. When capture has been completed, a change to '1' on signal 315 happens when the condition S=½ H=½ B is obtained, which is at the mid-point of an input data interval.

First Cycle

After initialization, the data 300 periodically makes either a zero-to-one or a one-to-zero transition. On this first edge received after initialization, the edge detector 301 issues a signal 313 that starts both the master counter 311 and the sample counter 304. The next edge (second) received stops the master counter 311 and causes the comparator 303 to test the value of the 'F' (holding resister all '1') against the new value 'I' reached in the master counter during the first cycle. Because 'I' is some multiple of 'B', but is by definition less than 'F', the comparator initiates a load signal loading the new value 'I' into the holding register 302. The first cycle concludes with the content of the holding register H, equal to I.

Second and All Ensuing Cycles

The next (third) edge detected by the edge detector 301 starts the master counter at count 'zero' again. The next (fourth) input data edge detected by 301 stops the master counter again. The comparator 303 then compares the values of the start value 'H' stored in the holding register to the new stop value 'N' of the master counter. If 'N'<'H', then the new value 'N' is loaded in to the holding register 302 on the following edge of HF sampling clock 310 and 'H'='N'. The continuous repetition of these cycles assures that the smallest time interval between transitions of input data is captured. By definition this is the baud rate period 'B' and with capture complete 'H'='B'.

The first edge detected by edge detector 301 also starts the sample counter 304. This enables the sample counter to start on a bit transition boundary as signaled by 313. The importance of this lies in that sampling must be done when the data is stable, and not during a transition. Once the sample counter 304 starts, it will not stop. The sample counter 304 will count up from an initial value of 'all zeros', until it reaches a value one-half that of the holding register [S=½ H] communicated via path 312. When this value is reached, the comparator 316 issues a multiplexer select signal 315 that will cause the sampling register 305 to latch in the new sampled data 300 at precisely the mid-point of the data interval. Then the sample counter 304 will continue counting up until its value equals 'H', the value stored in holding register 302. The sample counter 304 then clears itself to state '0', and commences counting up again. After capture is complete and 'H'='B', the data 300 will be stored in sampling register 305 each and every time that the sample counter reaches the value [S=½ B].

Sampling when the sample count 'S' 314 is one-half that of the value 'B' stored in the holding register after many cycles ensures that the data is sampled in the middle of its stable period. When this happens, the holding register 302 holds the baud rate 'B' of the incoming data and this baud rate 312 may in turn be used to control the sampling clock.

The circuitry illustrated in FIG. 3 provides a relatively simple means of extracting the baud rate from incoming asynchronous data. The circuitry also carries out sampling at the incoming data rate with timing consistent with sampling in a time interval wherein the incoming data is stable.

What is claimed is:

1. A data processing apparatus for automatic baud rate detection of asynchronous data input comprising:
    an edge detector receiving asynchronous data input;
    an externally supplied sampling clock of many times higher frequency than expected baud rate;
    a master counter coupled to said sampling clock, said master counter counting between successive asynchronous data edges;
    a holding register coupled to sampling clock;
    a first comparator coupled to said sampling clock said first comparator acting to replace count in holding register with count in master counter if master count is less than holding count held in holding register, said replacement count fixed upon second detected edge;
    a sample counter coupled to sampling clock and further coupled to said edge detector, said sample counter driving a second comparator detecting a desired input sampling condition and driving a multiplexer with output coupled to data input of a data sampling register, said data sampling register also coupled to sampling clock and storing asynchronous data when sample counter value becomes equal to a predetermined fraction of holding count.

2. The data processing apparatus of claim 1 wherein:
    said holding register initialized to all logical '1' states.

3. The data processing apparatus of claim 1 wherein:
    said sample counter counts clocks in synchronization with master counter; and
    a second comparator detects occurrence of sample count being equal to one-half the stored holding register count and on said occurrence triggers taking of data sample.

4. The data processing apparatus of claim 3 further comprising:
    a two input multiplexer having a first input receiving the asynchronous data input and a second input receiving output data of said sampling register, and an output connected to D data input of sampling register and said second comparator controls multiplexer to select asynchronous data input only on clock cycle following detection of condition that sample count equals one-half stored holding register count.

5. A data processing method of automatic baud rate detection comprising the steps of:
   detecting edges in asynchronous data;
   repetitively counting clock pulses of clock higher in frequency than the expected baud rate between consecutive detected edges;
   storing a baud rate count, said baud rate count initialized to all 1's;
   comparing each count of clock pulses between consecutive detected edges with said stored baud rate count and replacing said stored baud rate count with said count between consecutive edges if said count between consecutive edges is smaller than said stored baud rate count; and
   sampling asynchronous data on predetermined fraction of said stored baud rate count.

6. The data processing method of claim 5 wherein:
   said step of sampling asynchronous data on a predetermined fraction of said stored baud rate count includes
   clock pulses since a last detected edge,
   comparing said sample count to said stored baud rate count, and
   sampling asynchronous data when said sample count reaches said predetermined fraction of said stored baud rate count.

7. The data processing method of claim 6 wherein:
   the predetermined fraction of said stored baud rate count equals one half.

8. The data processing method of claim 5 wherein:
   the predetermined fraction of said stored baud rate count equals one half.

* * * * *